(12) United States Patent
Fischer

(10) Patent No.: US 8,221,843 B2
(45) Date of Patent: Jul. 17, 2012

(54) METHODS AND COMPOSITIONS FOR COATING INTERIOR COMPONENTS OF MOTOR VEHICLES AND INTERIOR COMPONENTS OF MOTOR VEHICLES COATED USING SAME

(75) Inventor: Wolfgang Fischer, Neufahrn (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 500 days.

(21) Appl. No.: 12/400,748

(22) Filed: Mar. 9, 2009

(65) Prior Publication Data

US 2009/0232993 A1    Sep. 17, 2009

Related U.S. Application Data

(63) Continuation-in-part of application No. 11/346,992, filed on Feb. 3, 2006, now abandoned.

(30) Foreign Application Priority Data

Feb. 15, 2005   (DE) .................. 10 2005 006 770

(51) Int. Cl.
*B05D 1/40* (2006.01)
*B05D 3/02* (2006.01)

(52) U.S. Cl. .................. 427/372.2; 427/331; 427/384; 427/385.5

(58) Field of Classification Search .................. None
See application file for complete search history.

(56) References Cited

U.S. PATENT DOCUMENTS

| | | | |
|---|---|---|---|
| 5,231,253 A | 7/1993 | Breed et al. | |
| 5,308,112 A | 5/1994 | Hill et al. | |
| 5,316,822 A | 5/1994 | Nishijima et al. | |
| 5,443,777 A | 8/1995 | Mills | |
| 5,488,092 A * | 1/1996 | Kausch et al. | 528/60 |
| 5,698,283 A | 12/1997 | Yamasaki et al. | |
| 5,839,752 A | 11/1998 | Yamasaki et al. | |
| 5,868,420 A | 2/1999 | Higashiura et al. | |
| 5,979,931 A | 11/1999 | Totani et al. | |
| 5,997,030 A | 12/1999 | Hannert et al. | |
| 6,022,623 A | 2/2000 | Clerici et al. | |
| 6,042,139 A | 3/2000 | Knox | |
| 6,109,645 A | 8/2000 | Totani et al. | |
| 6,113,131 A | 9/2000 | Uehara et al. | |
| 6,199,897 B1 | 3/2001 | Kreile | |
| 6,276,712 B1 | 8/2001 | Welch et al. | |
| 6,325,410 B1 | 12/2001 | Eyrainer | |
| 6,357,788 B2 | 3/2002 | Kreile | |
| 6,402,189 B1 | 6/2002 | Gray et al. | |
| 6,753,057 B1 | 6/2004 | Gardner | |
| 6,764,633 B2 | 7/2004 | Takahashi et al. | |
| 7,139,650 B2 | 11/2006 | Lubischer | |
| 7,384,063 B2 | 6/2008 | Riester et al. | |
| 7,458,604 B2 | 12/2008 | Hier et al. | |
| 7,490,851 B2 | 2/2009 | Riester et al. | |
| 2002/0060447 A1 | 5/2002 | Acker et al. | |
| 2002/0164528 A1 | 11/2002 | Sunagawa et al. | |
| 2003/0011174 A1 | 1/2003 | Merrifield et al. | |
| 2004/0155441 A1 | 8/2004 | Hofmann | |
| 2004/0164531 A1 | 8/2004 | Riha et al. | |
| 2004/0199319 A1 | 10/2004 | Lubischer | |
| 2005/0040629 A1 | 2/2005 | Chausset | |
| 2005/0052005 A1 | 3/2005 | Lunt et al. | |
| 2005/0215143 A1 | 9/2005 | Hehn et al. | |
| 2006/0082106 A1 | 4/2006 | Hier et al. | |

FOREIGN PATENT DOCUMENTS

| | | |
|---|---|---|
| DE | 19516230 C2 | 11/1996 |
| DE | 19648138 A1 | 5/1998 |
| DE | 198 19 537 A1 | 11/1998 |
| DE | 198 00 815 C1 | 2/1999 |
| DE | 19944371 A1 | 3/2001 |
| DE | 101 17 938 A1 | 4/2001 |
| DE | 101 04 036 A1 | 8/2001 |
| DE | 101 35 224 A1 | 7/2002 |
| DE | 102 29 962 A1 | 1/2004 |
| DE | 10241715 A1 | 3/2004 |
| DE | 103 15 662 A1 | 10/2004 |
| DE | 103 61 581 A1 | 7/2005 |
| DE | 102004014942 A1 | 10/2005 |
| EP | 0827867 A1 | 7/1997 |
| EP | 0827867 B1 | 7/1997 |
| EP | 0916555 A | 5/1999 |
| EP | 1 445 156 A1 | 11/2003 |
| FR | 2 721 876 A | 1/1996 |
| FR | 2792271 A | 10/2000 |
| FR | 2799700 A1 | 4/2001 |
| JP | 05162598 A | 6/1993 |
| JP | 0827409 | 1/1996 |
| WO | WO 97/03866 A | 2/1997 |
| WO | WO 2004/087473 A | 10/2004 |

* cited by examiner

*Primary Examiner* — Sheeba Ahmed
(74) *Attorney, Agent, or Firm* — Wolf, Greenfield & Sacks, P.C.

(57) ABSTRACT

A coating composition for coating at least one contact surface of a component is disclosed as well as methods of coating the component with the coating composition. The component may be, for example, an interior trim part for interiors of motor vehicles. The contact surface contacts at least one other component and on which relative movement occurs. The coating may be a wear-resistant and/or a low-friction coating. The coating may be formed on the component from a paint composition and a hardener composition. When the coating is dry, the coating may have a dried layer thickness of between about 25 micrometers and about 100 micrometers.

29 Claims, No Drawings

METHODS AND COMPOSITIONS FOR COATING INTERIOR COMPONENTS OF MOTOR VEHICLES AND INTERIOR COMPONENTS OF MOTOR VEHICLES COATED USING SAME

RELATED APPLICATIONS

This application is a continuation in part of co-pending U.S. patent application Ser. No. 11/346,992, entitled "Interior Trim Part for Interiors of Motor Vehicles," by W. Fischer, filed on Feb. 3, 2006, published as U.S. Pat. Apl. Pub. No. 2006/0188669 on Aug. 24, 2006, which is incorporated herein by reference in its entirety.

BACKGROUND

1. Field

Compositions and methods for forming a coating on a component having a contact surface are generally disclosed. In some cases, the coating may be wear-resistant and/or have low friction.

2. Discussion of Related Art

The relative movement that occurs between automobile components that are placed in contact with adjacent components often results in increased noise. This noise is often manifested as an unpleasant creaking and/or squeaking sound. For some components, particularly in those components where sound transmission effects are, to an extent, masked, the region where the noise originates is often difficult to precisely locate. For reducing such noise, components are sometimes provided with a coating. Coatings can, for instance, contain solid lubricants, as is the case with the coating disclosed in EP 0 827 867. Coatings can also contain rubber particles, as suggested in JP 08027409 A.

In prior coating arrangements, the application of the coating is relatively complex. Such coatings are typically applied by spraying and often require separate first and second coatings. Coating with multiple layers often require considerable drying times between application of each layer.

A disadvantage with conventional thin coatings is that they may have a relatively low wear durability, making them susceptible to premature wear under normal driving conditions.

SUMMARY

Components having a coating and a contact surface are described herein.

In one illustrative embodiment, a method is described. The method includes applying an initial composition to a contact surface of a component, the initial composition including water at a concentration of up to about 50% by volume, a co-solvent at a concentration of between about 9% by volume and about 10% by volume, and a hardener, wherein the ratio of hardener content to non-hardener content of the initial composition is between about 10 parts and about 20 parts of hardener per 100 parts by weight of non-hardener content; and drying the initial composition to form a dried coating on the contact surface of the component, the dried coating having a dried layer thickness of between about 28 micrometers and about 73 micrometers.

In another illustrative embodiment, a method of producing a component having a contact surface on which relative movement with at least one other component occurs is described. The method includes forming an initial composition including water at a concentration of up to about 50% by volume, a co-solvent at a concentration of between about 9% by volume and about 10% by volume, and a hardener, wherein the ratio of hardener content to non-hardener content of the initial composition is between about 10 parts and about 20 parts of hardener per 100 parts of non-hardener content; applying the initial composition to the contact surface of the component; and drying the initial composition to form a dried coating on the contact surface of the component, the dried coating having a dried layer thickness of between about 28 micrometers and about 73 micrometers.

In a further illustrative embodiment, a motor vehicle component produced by a process is described. The process includes applying an initial composition to a contact surface of the component, the initial composition including water at a concentration of up to about 50% by volume, a co-solvent at a concentration of between about 9% by volume and about 10% by volume, and a hardener, wherein the ratio of hardener content to non-hardener content the initial composition is of between about 10 parts and about 20 parts of hardener per 100 parts by weight of non-hardener content; and drying the initial composition to form a dried coating on the contact surface of the component, the dried coating having a dried layer thickness of between about 28 micrometers and about 73 micrometers.

In yet another illustrative embodiment, a method is described. The method includes mixing a hardener composition with an initial paint composition to form an initial coating composition, the initial coating composition having a ratio of between about 10 parts by weight and about 30 parts by weight of the hardener composition per 100 parts by weight of the initial paint composition, the initial paint composition having a water content of up to about 60% by weight of the initial paint composition and a paint co-solvent content of between about 9% by weight of the initial paint composition and about 20% by weight of the initial paint composition; applying the initial coating composition to a component; and drying the initial coating composition to form a coating on the component having a dried layer thickness of between about 25 micrometers and about 100 micrometers.

In a further illustrative embodiment, a component having a contact surface on which relative movement with at least one other component occurs is described. The component includes a coating formed on the component, the coating, when dried, having a dried layer thickness of between about 25 μm and about 100 μm. The coating initially includes an initial paint composition having a water content of up to about 60% by weight of the initial paint composition and a paint co-solvent content of between about 9% by weight and about 20% by weight; and a hardener composition mixed with the initial paint composition at a ratio of between about 10 parts by weight and about 30 parts by weight of the hardener composition per 100 parts by weight of the initial paint composition.

In another illustrative embodiment, a component having a dried coating thereon, the dried coating having a dried layer thickness of between about 25 micrometers and about 100 micrometers is described. The dried coating is produced by a process. The process includes applying, to the component, an initial composition comprising a mixture of an initial paint composition and a hardener composition at a ratio of between about 10 parts by weight and about 30 parts by weight of the hardener composition per 100 parts by weight of the initial paint composition, the initial paint composition having a water content of up to about 60% by weight and a co-solvent content of between about 9% by weight and about 20% by weight; and drying the initial composition to form the dried coating.

In another illustrative embodiment, a method of producing a component having a contact surface on which relative movement with at least one other component occurs is described. The method includes forming a coating on the component, the coating, when dried, having a dried layer thickness of between about 25 μm and about 100 μm. Forming the coating includes providing an initial paint composition having a water content of up to about 60% by weight of the initial paint composition, and a paint co-solvent content of between about 9% by weight and about 20% by weight of the initial paint composition; and mixing a hardener composition with the initial paint composition at a ratio of between about 10 parts by weight and about 30 parts by weight of the hardener composition per 100 parts by weight of the initial paint composition.

In a further illustrative embodiment, a method is described. The method includes applying, to a component, an initial coating composition comprising a mixture of an initial paint composition and a hardener composition at a ratio of between about 10 parts by weight and about 30 parts by weight of the hardener composition per 100 parts by weight of the initial paint composition. The initial paint composition includes a water content of up to about 60% by weight of the initial paint composition; a paint resin of between about 35% by weight and about 45% by weight of the initial paint composition; a paint co-solvent of between about 9% by weight and about 20% by weight of the initial paint composition; one or more paint additives the total content of which being between about 1% by weight and about 2% by weight of the initial paint composition; and a paint total solids content of between about 35% by weight and about 65% by weight of the initial paint composition. The hardener composition includes an isocyanate composition of between about 50% by weight and about 80% by weight of the hardener composition; a hardener solvent of between about 10% by weight and about 40% by weight of the hardener composition; and a hardener total solids content of between about 60% by weight and about 85% by weight of the hardener composition. The method also includes drying the initial coating composition to form a coating on the component having a dried layer thickness of between about 25 micrometers and about 100 micrometers.

In another illustrative embodiment, a component, having a dried coating thereon, the dried coating having dried layer thickness of between about 25 micrometers and about 100 micrometers is described. The coating is produced by a process. The process includes applying, to the component, a mixture of an initial paint composition and an hardener composition mixed at a ratio of between about 10 parts by weight and about 30 parts by weight of the hardener composition per 100 parts by weight of the initial paint composition. The initial paint composition includes a water content of up to about 60% by weight of the initial paint composition; a paint resin of between about 35% by weight and about 45% by weight of the initial paint composition; a paint co-solvent of between about 9% by weight and about 20% by weight of the initial paint composition; one or more paint additives of between about 1% by weight and about 2% by weight of the initial paint composition; and a total paint solids content of between about 35% by weight and about 65% by weight of the initial paint composition. The hardener composition includes an isocyanate composition of between about 50% by weight and about 80% by weight of the hardener composition; a hardener solvent of between about 10% by weight and about 40% by weight of the hardener composition; and a total hardener solids content of between about 60% by weight and about 85% by weight of the hardener composition. The process also includes drying the mixture on the component to produce a dried coating.

In a further illustrative embodiment, a component having a contact surface on which relative movement with at least one other component occurs is described. The component includes a coating formed on the component, the coating, when dried, having a dried layer thickness of between about 25 μm and about 100 μm. The coating initially includes an initial paint composition and an hardener composition mixed at a ratio of between about 10 parts by weight and about 30 parts by weight of the hardener composition per 100 parts by weight of the initial paint composition. The initial paint composition includes, prior to mixing with the hardener composition, a water content of up to about 60% by weight of the initial paint composition; a paint resin of between about 35% by weight and about 45% by weight of the initial paint composition; a paint co-solvent of between about 9% by weight and about 20% by weight of the initial paint composition; one or more paint additives of between about 1% by weight and about 2% by weight of the initial paint composition; and a total paint solid content of between about 35% by weight and about 65% by weight of the initial paint composition. The hardener composition includes an isocyanate composition of between about 50% by weight and about 80% by weight of the hardener composition; a hardener solvent of between about 10% by weight and about 40% by weight of the hardener composition; and a total hardener solids content of between about 60% by weight and about 85% by weight of the hardener composition.

Various embodiments of the present inventions provide certain advantages. Not all embodiments of the invention share the same advantages and those that do may not share them under all circumstances.

Other advantages and novel features of the present invention will become apparent from the following detailed description of various non-limiting embodiments of the invention when considered in conjunction with the accompanying figures.

DETAILED DESCRIPTION

The following description is not limited in its application only to the details of construction and the arrangement of components set forth as examples of the invention in the following description or illustrated in the drawings. Other embodiments may be employed and aspects of the inventions may be practiced or be carried out in various ways. Also, the phraseology and terminology used herein is for the purpose of description and should not be regarded as limiting. The use of "including," "comprising," "having," "containing," "involving," and/or variations thereof herein, is meant to encompass the items listed thereafter and equivalents thereof as well as additional items.

Certain embodiments described herein are directed to a component that includes a coating having characteristics such as wear-resistance, low friction, and/or low noise characteristics. The component may be, for example, an interior trim part for automotive interiors, a trim piece for a motor vehicle, or any other suitable vehicle component. The coating may be formed from two or more compositions that are mixed together in an appropriate ratio to form a coating composition before application of the coating composition to the component to form the coating on to the component. The compositions may include, for example, a paint composition and a hardener composition. The paint composition may include any number of suitable components, for example, paint resin, water, paint co-solvent, other solids (e.g. fillers, pigments, etc.), as well as other paint additives. The hardener composition may include suitable hardener components, including aliphatic and/or aromatic compounds, hardener solvent, solids, in addition to any other appropriate hardener additives. Generally, the hardener acts to promote curing of the overall composition.

The coating composition can be applied, using any suitable technique, for example, via an injection molding process, by spray coating, dip coating, brush coating, etc. In some embodiments, once applied to the component, the overall drying time for applying the coating is reduced, for example, as it may not be necessary to apply additional coating layers, each having its own drying time, on the component. In some cases, the coating provides for increased wear-resistance and/or durability in the components as compared with other coating formulations. When a component coated with the coating contacts the surface of another component, the coating may provide reduced friction upon relative contact as compared with other coating formulations. The coating also can in certain embodiments provide for reduced noise generation and/or vibration upon relative movement between a component coated with the coating and an adjacent component that may or may not have a coating, when compared to typical conventional coatings used for similar purposes.

As previously mentioned, the coating composition may include a paint composition. In some embodiments, the paint composition is a polyol composition. As described herein, a polyol composition is any composition including a compound containing multiple hydroxyl groups. Other non-limiting examples of a paint compositions include acrylics. It should be appreciated that any suitable paint composition may be used. A non-limiting example of a suitable paint compositions includes commercially available paints such as 2K-Hydrosoftlack R6490 available from Karl Wörwag Lack- und Farbenfabrik GmbH & Co. KG, Stuttgart, Germany. In some cases, for example, the 2K-Hydrosoftlack R6490 is used with the commercially available primer R1474 also available from Wörwag. Another example of a suitable paint composition is Sensosoft 2K-Hydrolack paint available from Schramm Coatings GmbH, Offenbach, Germany. A further example of a suitable paint composition is Alexit-Soft Coating 341-88 available from Mankiewicz Gebr. & Co., Hamburg, Germany. Yet another example of a suitable paint composition is Alexit-Komfortlack 342-44 coating from Mankiewicz Gebr. & Co., Hamburg, Germany. In some cases the paint composition including Alexit-Komfortlack 342-44 may also include Alexit-Primer 343-39 primer from Mankiewicz Gebr. & Co., Hamburg, Germany.

Prior to application of the coating composition to the component, the paint composition may be initially "wet," i.e., having an appropriate water content. The "water content" is the amount of water that is present in the paint composition. The initial paint composition is mixed with the hardener composition to form an initial coating composition. The paint composition may be mixed with the hardener composition to form the initial coating composition prior to application to the component or substantially simultaneously upon application. In alternative embodiments, the initial coating composition may be formed on the coated component by first applying the paint composition followed by the hardener composition or by first applying the hardener composition followed by the paint composition. In any case, once applied to the component, the initial coating composition is dried and/or cured to form a dried coating on the contact surface of the component.

The coating may be dried using any suitable technique, e.g., air drying, or the drying may be facilitated using heat, dehumidified air, or the like.

The initial paint composition may include water. In some embodiments, the initial paint composition includes a non-zero water content of up to about 60% by weight of the initial paint composition, up to about 55% by weight of the initial paint composition, up to about 50% by weight of the initial paint composition, between about 40% and about 60% by weight of the initial paint composition, between about 40% and about 55% by weight of the initial paint composition, between about 50% and about 55% by weight of the initial paint composition, between about 50% and about 60% by weight of the initial paint composition, or between about 55% and about 60% by weight of the initial paint composition. In some cases, the percentage of water content of the initial paint composition may be specified on the basis of volume of the initial paint composition as opposed to by weight. For example, in certain embodiments, the initial paint composition includes a non-zero water content of up to about 60% by volume of the initial paint composition, up to about 55% by volume of the initial paint composition, up to about 50% by volume of the initial paint composition, between about 40% and about 60% by volume of the initial paint composition, between about 40% and about 55% by volume of the initial paint composition, between about 50% and about 55% by volume of the initial paint composition, between about 50% and about 60% by weight of the initial paint composition, or between about 55% and about 60% by weight of the initial paint composition.

The initial paint composition may in certain embodiments also include a suitable, non-aqueous liquid solvent, also referred to herein as a paint co-solvent. Non-limiting examples of potentially suitable paint co-solvents include non-aqueous polar solvents, ethers, polyesters, alcohols, polyalcohols, esters, glycols and combinations thereof. As described herein, a paint co-solvent content refers to the amount of paint co-solvent that is present in a given paint composition. In some embodiments, the initial paint composition includes a paint co-solvent content between about 9% by weight and about 20% by weight of the initial paint composition. In some embodiments, the initial paint composition includes a paint co-solvent content between about 10% by weight and about 20% by weight of the initial paint composition, between about 9% by weight and about 15% by weight of the initial paint composition, between about 9% by weight and about 10% by weight of the initial paint composition, between about 10% by weight and about 15% by weight of the initial paint composition, or between about 15% by weight and about 20% by weight of the initial paint composition. In some embodiments, the percentage of paint co-solvent of the initial paint composition may be specified on the basis of volume of the initial paint composition as opposed to by weight. For example, in certain embodiments, the initial paint composition includes a paint co-solvent content between about 10% by volume and about 20% by volume of the initial paint composition. In some embodiments, the initial paint composition includes a paint co-solvent content between about 9% by volume and about 15% by volume of the initial paint composition, between about 9% by volume and about 10% by volume of the initial paint composition, between about 10% by volume and about 15% by volume of the initial paint composition, between about 15% by volume and about 20% by volume of the initial paint composition, or between about 9% by volume and about 20% by volume of the initial paint composition.

The total liquid content of the initial paint composition includes water and paint co-solvent. In some embodiments, for example, the initial paint composition includes a total liquid content of between about 49% by weight and about 80% by weight of the initial paint composition, between about 49% by weight and about 75% by weight of the initial paint composition, between about 49% by weight and about 70% by weight of the initial paint composition, between about 35% by weight and about 70% by weight of the initial paint composition, between about 35% by weight and about 65% by weight of the initial paint composition, between about 35% by weight and about 49% by weight of the initial paint composition, between about 49% by weight and about 65% by weight of the initial paint composition, or between about 65% by weight and about 70% by weight of the initial paint composition. In some cases, the percentage of total liquid content of the initial paint composition may be specified on the basis of volume of the initial paint composition as opposed to by weight. For example, in certain embodiments, the initial paint composition includes a total liquid content of between about 49% by volume and about 80% by volume of the initial paint composition, between about 49% by volume and about 75% by volume of the initial paint composition, between about 49% by volume and about 70% by volume of the initial paint composition, between about 35% by volume and about 70% by volume of the initial paint composition, between about 35% by volume and about 65% by volume of the initial paint composition, between about 35% by volume and about 49% by volume of the initial paint composition, between about 49% by volume and about 65% by volume of the initial paint composition, or between about 65% by volume and about 70% by volume of the initial paint composition.

The initial paint composition in certain embodiments includes a suitable paint resin. Non-limiting examples of potentially suitable paint resins include polyalcohols (polyols), polyesters, polyester acrylates, and combinations of these and/or other appropriate resin compositions. As described herein, paint resin content refers to the amount of paint resin that is present in a given composition. In some embodiments, the initial paint composition includes a paint resin content between about 35% by weight and about 45% by weight of the initial paint composition. In some embodiments, the percentage of paint resin of the initial paint composition may be specified on the basis of volume of the initial paint composition as opposed to by weight.

In certain embodiments, the initial paint composition includes one or more suitable additional additives, referred to herein collectively as paint additives. Non-limiting examples of such additives include pigments, fillers (e.g., $SiO_2$), viscosity modifiers, combinations of these and/or other appropriate compositions to add desirable characteristics. As described herein, a paint additive content refers to the amount of paint additive that is present in a given composition. In some embodiments, the initial paint composition includes a paint additive content of up to about 2% by weight of the initial paint composition, or between about 1% by weight and about 2% by weight of the initial paint composition. In some embodiments, the percentage of paint additive content of the initial paint composition may be specified on the basis of volume of the initial paint composition as opposed to by weight.

The total solids content of the initial paint composition (which may include, for example, paint resin(s), pigments, certain paint additives, etc.) in certain embodiments is between about 30% by weight and about 65% by weight of the initial paint composition, between about 35% by weight and about 65% by weight of the initial paint composition, between about 51% by weight and about 65% by weight of the initial paint composition, between about 30% by weight and about 35% by weight of the initial paint composition, or between about 30% by weight and about 51% by weight of the initial paint composition. In some embodiments, the of paint solids content of the initial paint composition may be specified on the basis of volume of the initial paint composition as opposed to by weight.

As discussed, certain embodiments of the initial coating compositions also include a hardener composition. The hardener composition in certain embodiments comprises at least one organic compound that is either aliphatic or aromatic in nature. In addition, the hardener composition may include cross-linking or other curing agent(s) to facilitate formation of the final set coating on the coated component. For instance, in certain cases, an appropriately selected hardener can decrease the time at which the coating cures, relative to the same composition in which the hardener is absent and/or can contribute to the final set coating having a degree of hardness and other physical properties that enable a thinner coating layer to provide similar or superior benefits for reducing noise, friction, etc. than typical prior art coatings used for these purposes.

The hardener composition in certain embodiments includes at least one isocyanate compounds. As described herein, an isocyanate compound refers to any compound containing the functional group N=C=O. Non-limiting examples of potentially suitable isocyanate compounds include hexamethylene diisocyanate, polyisocyanates, and/or other appropriate compositions. In some embodiments, the hardener composition includes an isocyanate compound(s) present at a concentration of between about 50% by weight and about 80% by weight of the hardener composition. In some embodiments, the percentage of isocyanate compound(s) of the hardener composition may be specified on the basis of volume of the hardener composition as opposed to by weight.

In addition, the hardener composition may include a solvent (also referred to as a hardener solvent). Non-limiting examples of potentially suitable hardener solvents include acetates, aromatic solvents, and combinations thereof. In some embodiments, the hardener composition includes a hardener solvent content of between about 10% by weight and about 40% by weight of the hardener composition. In some embodiments, the percentage of hardener solvent of the hardener composition may be specified on the basis of volume of the hardener composition as opposed to by weight.

The total solids content of the hardener composition in some embodiments is less than about 78% by weight of the hardener composition, between about 60% by weight and about 85% by weight of the hardener composition, or between about 78% by weight and about 85% by weight of the hardener composition. In some embodiments, the of hardener solid content of the hardener composition may be specified on the basis of volume of the hardener composition as opposed to by weight.

To form an appropriate initial coating composition for applying a coating to a component, in certain embodiments the initial paint composition is mixed with the hardener composition at some point. In some embodiments, the initial paint composition is mixed with the hardener composition at a ratio of between about 10 parts by weight and about 30 parts by weight of the hardener composition to about 100 parts by weight of the initial paint composition. In some embodiments, the initial paint composition is mixed with the hardener composition at a ratio of between about 10 parts by weight and about 20 parts by weight of the hardener composition to 100 parts by weight of the initial paint composition. In some embodiments, the initial paint composition is mixed with the hardener composition at a ratio of between about 20 parts by weight and about 30 parts by weight of the hardener composition to 100 parts by weight of the initial paint composition. It can be appreciated that the coating composition in certain embodiment may include an appropriate combination of the some or all of the above-noted features and/or ingredients. The initial paint composition in some cases herein is referred to as the non-hardener composition or non-hardener content of the initial coating composition.

The initial paint composition can be mixed with the hardener composition to form a coating composition in any suitable manner. As described herein, the initial coating composition is the composition is the results of admixture of the initial paint composition and the hardener composition prior to drying. Once the coating composition is dried, for example, the coating composition ceases to be an initial coating composition.

In some embodiments, the initial paint composition and the hardener composition are injected into a mold or container where the initial paint composition and the hardener composition mix to form the initial coating composition. In some cases, the initial paint composition and the hardener composition are manually mixed to form the coating composition, or they may be mixed using a suitable mixer. In certain embodiments, once the initial paint composition and the hardener composition are mixed together to form the initial coating composition, reactions are initiated such that the coating composition hardens with time. As a result, a relatively brief period of time may exist in certain embodiments for the initial coating composition to be applied before the coating composition hardens to a degree where the coating cannot be easily applied. In some cases, the initial coating composition is evenly spread, dispersed, sprayed, etc. upon the component to a specific thickness to form a desired final coating thickness on the component. The thickness of initial coating composition required to be applied to yield a particular dried coating thickness will depend on factors such as the nature of the ingredients of the paint composition and hardener composition, the solids content of each, etc. and can be determined for any particular initial coating composition according to the invention by routine experimentation and testing.

After the initial coating composition is applied to a contact surface of the component, the coating can be allowed to dry to a suitable thickness on the contact surface of the component. In some embodiments, the coating formed on the component, when dried, has a dried layer thickness of between about 25 micrometers and about 100 micrometers, between about 28 micrometers and about 73 micrometers, between about 35 micrometers and about 65 micrometers, between about 45 micrometers and about 55 micrometers, between about 25 micrometers and about 28 micrometers, between about 25 micrometers and about 35 micrometers, between about 25 micrometers and about 45 micrometers, between about 73 micrometers and about 100 micrometers, between about 65 micrometers and about 100 micrometers, or between about 55 micrometers and about 100 micrometers. Thickness can be measured by any of a variety of suitable methods known in the art.

Certain of the coating compositions described herein are able to give rise to one or more desirable characteristics. For example, certain inventive coatings when applied on a component are able to exhibit one or more of softness, wear-resistance and low-friction properties when placed in contact with another contact surface that are superior to typical conventional coatings. The properties of the final coating will generally depend on a number of factors. These factors may include what kind of paint resin is used, e.g. the number of hydroxyl groups in the resin when the resin is a polyol, the concentration of various components, mixture ratios of paint composition to hardener composition used to form the coating, etc. Generally, when more paint resin is incorporated in the paint composition, the resulting coating will be relatively softer than when less is used. However, if cross-linking increases (e.g. between hydroxyl groups and isocyanate) via the addition of a larger ratio of hardener composition to paint composition, the resulting coating will be relatively harder.

An additional advantage in using certain inventive initial coating compositions as described herein is that they may be applied in a one-coat application procedure, as compared to prior art complex dual-layer coatings so that intermediate drying times are not required. Improved gliding may also achieved with coatings provided by the invention at various temperature ranges with minimal creaking and/or squeaking noises as compared to typical prior art coatings employed for similar purposes.

Furthermore, applying a one-layer coating on components, as discussed above, can be readily performed in conventional painting facilities, whereas complex two or more stage prior art coating processes and coatings can require more expensive, customized coating procedures, facilities and/or equipment. A one-coat process can be performed without having to provide and schedule intermediate drying times.

The foregoing written specification describes the best mode for carrying out the invention; however those skilled in the art to which this invention relates will recognize various alternative embodiments for practicing the invention within the scope of the following claims. Having thus described several aspects of at least one embodiment of this invention, it is to be appreciated various alterations, modifications, and improvements will readily occur to those skilled in the art. Such alterations, modifications, and improvements are intended to be part of this disclosure, and are within the scope of the invention. Accordingly, the foregoing description is by way of example only.

What is claimed is:

1. A method, comprising:
    applying an initial composition to a contact surface of a component, the initial composition comprising water at a concentration of greater than 0% and up to about 50% by volume, a paint co-solvent between about 9% by volume and about 10% by volume, and a hardener, wherein the hardener comprises an isocyanate composition, a hardener solvent and a hardener solids content, the isocyanate composition comprising between about 50% by weight and about 80% by weight of the hardener, and wherein the ratio of hardener content to non-hardener content of the initial composition is between about 10 parts and about 20 parts of hardener per 100 parts by weight of non-hardener content; and
    drying the initial composition to form a dried coating on the contact surface of the component, the dried coating having a dried layer thickness of between about 28 micrometers and about 73 micrometers.

2. The method according to claim 1, wherein the dried coating has a dried layer thickness of between about 35 micrometers and about 65 micrometers.

3. The method according to claim 1, wherein the dried coating has a dried layer thickness of between about 45 micrometers and about 55 micrometers.

4. The method according to claim 1, wherein the hardener of the initial composition comprises a solids content of less than about 78% by weight.

5. The method according to claim 2, wherein the hardener of the initial composition comprises a solids content of less than about 78% by weight.

6. The method according to claim 3, wherein the hardener of the initial composition comprises a solids content of less than about 78% by weight.

7. The method according to claim 1, wherein the dried coating is wear-resistant.

8. The method according to claim 1, wherein the dried coating is a low-friction coating.

9. The method according to claim 1, wherein the component is a motor vehicle component.

10. The method according to claim 9, wherein the motor vehicle component is a trim piece for a motor vehicle.

11. The method according to claim 10, wherein the trim piece is an interior trim piece.

12. The method of claim 1, wherein the component has a contact surface on which relative movement with at least one other component occurs.

13. A method, comprising:
mixing a hardener composition with an initial paint composition to form an initial coating composition, the initial coating composition having a ratio of between about 10 parts by weight and about 30 parts by weight of the hardener composition per 100 parts by weight of the initial paint composition, the initial paint composition having a non-zero water content of up to about 60% by weight of the initial paint composition and a paint co-solvent content of between about 9% by weight of the initial paint composition and about 20% by weight of the initial paint composition, and the hardener composition comprising an isocyanate composition, a hardener solvent and a hardener solids content, the isocyanate composition comprising between about 50% by weight and about 80% by weight of the hardener composition;
applying the initial coating composition to a component; and
drying the initial coating composition to form a coating on the component having a dried layer thickness of between about 25 micrometers and about 100 micrometers.

14. The method of claim 13, wherein the water content of the initial paint composition is between about 40% by weight of the initial paint composition and about 60% by weight of the initial paint composition.

15. The method of claim 14, wherein the water content of the initial paint composition is between about 40% by weight of the initial paint composition and about 55% by weight of the initial paint composition.

16. The method of claim 14, wherein the component has a contact surface on which relative movement with at least one other component occurs.

17. The method of claim 14, wherein the initial paint composition comprises a polyol.

18. The method of claim 14, wherein the hardener composition comprises an isocyanate.

19. The method of claim 14, wherein the initial paint composition further comprises a paint resin at a concentration of between about 35% by weight and about 45% by weight of the initial paint composition.

20. The method of claim 14, wherein the paint co-solvent content of the initial paint composition is between about 9% by weight and about 15% by weight of the initial paint composition.

21. The method of claim 14, wherein the initial paint composition further comprises paint additives at a concentration of between about 1% by weight and about 2% by weight of the initial paint composition.

22. The method of claim 14, wherein the initial paint composition further comprises a total paint solids content of between about 35% by weight and about 65% by weight of the initial paint composition.

23. The method of claim 14, wherein the hardener composition comprises a hardener solvent at a concentration of between about 10% by weight and about 40% by weight of the hardener composition.

24. The method of claim 14, wherein the hardener composition comprises a hardener total solids content of between about 60% by weight and about 85% by weight of the hardener composition.

25. The method of claim 14, wherein the hardener composition comprises hexamethylene diisocyanate at a concentration of between about 50% by weight and about 80% by weight of the hardener composition.

26. The method of claim 14, wherein the hardener composition comprises a polyisocyanate at a concentration of between about 50% by weight and about 80% by weight of the hardener composition.

27. A method, comprising:
applying, to a component, an initial coating composition comprising a mixture of an initial paint composition and a hardener composition at a ratio of between about 10 parts by weight and about 30 parts by weight of the hardener composition per 100 parts by weight of the initial paint composition,
the initial paint composition comprising:
a water content of up to about 60% by weight of the initial paint composition;
a paint resin of between about 35% by weight and about 45% by weight of the initial paint composition;
a paint co-solvent of between about 9% by weight and about 20% by weight of the initial paint composition;
one or more paint additives the total content of which being between about 1% by weight and about 2% by weight of the initial paint composition; and
a total paint solids content of between about 35% by weight and about 65% by weight of the initial paint composition, and
the hardener composition comprising:
an isocyanate composition of between about 50% by weight and about 80% by weight of the hardener composition;
a hardener solvent of between about 10% by weight and about 40% by weight of the hardener composition; and
a hardener total solids content of between about 60% by weight and about 85% by weight of the hardener composition, and
drying the initial coating composition to form a coating on the component having a dried layer thickness of between about 25 micrometers and about 100 micrometers.

28. The method of claim 27, wherein the water content of the initial paint composition is between about 40% by weight of the initial paint composition and about 60% by weight of the initial paint composition.

29. The method of claim 28, wherein the water content of the initial paint composition is between about 40% by weight of the initial paint composition and about 55% by weight of the initial paint composition.

* * * * *